Patented Jan. 6, 1942

2,268,971

UNITED STATES PATENT OFFICE 2,268,971

PROCESS FOR REMOVING FLUORIDES FROM WATER

Oliver M. Urbain and William R. Stemen, Columbus, Ohio, assignors to Charles H. Lewis, Harpster, Ohio No Drawing. Application November 19, 1937, Serial No. 175,539

6 Claims. (Cl. 210—23)

This invention relates to the purification of potable waters. It is more particularly related to the provision of materials and processes for the removal of fluorides from potable waters to render them less harmful for drinking and industrial purposes.

It has recently been discovered that when fluorides occur in waters used for human consumption, decidedly deleterious effects are noticeable among people consuming such waters. This is particularly true for growing children. It has been found that there occurs a serious mottling of the teeth of children living in communities where the fluoride content of drinking water exceeds 1.0 part per million. It is now known that such a condition of the teeth is only an outward indication of the more harmful effect of fluorides upon the bones of the body.

Public health authorities are at present insisting that water supplies which contain fluorides must be treated to reduce the fluoride content to 1.0 part per million or less. At present, there are no known satisfactory methods of reducing the fluoride content to this figure in an economical manner. Known methods for the removal of fluoride are unsatisfactory since they require a definite acidity of the water being treated, or the addition of other chemicals (which increases the costs considerably), and result in only partial removal of fluorides down to a content of 2.0 or 2.5 parts per million. Costs of present methods vary from 2½ to 10 cents per thousand gallons of water treated, depending upon the original content of fluorides and the extent to which this content is reduced.

In copending applications Serial Nos. 151,948 and 151,949, there are described methods for the satisfactory removal of fluorides down to a limit of 0.2 to 0.8 part per million. The processes disclosed and claimed in the copending applications involve the treatment of potable waters with base exchange materials or sorptive materials which have been pickled in solutions of aluminum salts. Such materials and processes are effective at any normal pH concentrations and the presence of anions and cations of other salts do not interfere in any manner. Their fluoride removing properties are attributed to their high content of adsorbed aluminum ions, since all soluble aluminum salts are removed by washing, before such materials are employed. Such materials may be regenerated and reused many times.

This invention represents an improvement upon the materials and processes described in the above mentioned copending applications. It has been found that if insoluble chemical compounds be formed in the presence of solutions of aluminum salts, such insoluble compounds possess a fluoride removing capacity several times that of the materials obtained by pickling preformed base exchange or sorptive materials in solutions of aluminum salts. Formation of the insoluble materials in the presence of a large excess of aluminum ions considerably increases the fluoride removing properties through an increase of charge of aluminum ions, since the materials are active even after all soluble aluminum salts have been removed by thorough washing.

It is therefore an object of the present invention to provide a simple and effective method to reduce the fluorine content of potable waters contaminated therewith. It is more particularly an object of this invention to provide materials and processes for the removal of fluorides to a quantity below the toxic point of 1.0 part per million. It is further an object of this invention to provide low cost materials, and processes operative at a cost considerably below that of present known methods. Other objects will be apparent from a more detailed consideration of this invention.

In the preparation of the new materials, solutions of certain compounds are brought into reaction to yield an insoluble base material. By the term insoluble is meant a solubility not greater than 0.250 gram in 100 cc. of distilled water at 70° F. It has been found that greater solubility than this would result in an uneconomical loss of material. In one method of producing these materials, one of the starting solutions must be a saturated or concentrated solution of a soluble salt of aluminum. In another method of producing such materials, a precipitation reaction is carried out between two solutions in the presence of a third solution of an aluminum salt. In all such reactions, however, it is necessary that the aluminum salt present be sufficient to supply at least 5 per cent in excess of aluminum ions required for stoichiometric reaction. If only two solutions are employed, it is necessary that the reactions be carried out by adding to the aluminum solution the other solution, with constant stirring. The precipitate formed by the reaction is recovered and after washing thoroughly to remove all soluble constituents, may be used either wet or dry. If the material is to be dried, it should be dried after washing in a current of warm air at a temperature not to exceed 90° C.

The materials thus formed may be added to the water to be treated in powdered form and after the removal of the fluorides, may be discarded. Or, such materials may be employed in the treatment of fluoride bearing waters, in the form of a filter bed, the liquid being passed through such materials. When employed in this manner, the materials may be easily regenerated by the use of such regenerating agents as soluble aluminum salts, dilute mineral acids, or dilute alkalis. Regeneration is accomplished by the conventional process of flowing the regenerating agent over the exhausted fluoride removing material.

Through the use of such materials, there has been effected reduction of fluorine content from solutions containing 10 to 15 parts per million of fluorides to a content ranging from zero to a few tenths of one part per million. Only a very short period of contact is necessary and if the contact filter method is used, the treating agent can be completely regenerated in a very few minutes.

As exemplary of the materials and processes of this invention, we give below a series of representative examples:

Example 1

A solution of sodium silicate was added with constant stirring to a solution of aluminum sulfate. The quantity of aluminum sulfate employed was in excess of that required to react with the sodium silicate. The precipitate of aluminum silicate was filtered off, thoroughly washed and dried in warm air at 90° C. Since this precipitate was formed in the presence of an aluminum salt solution, it possessed the particular properties of removing fluorides because of its high charge of uncombined aluminum ions. It was found that it was possible to reduce the fluoride content of a stock solution containing 10 parts per million to approximately 0.5 parts per million upon passing the stock solution through a filter containing this material.

The equation for this reaction is as follows:

$$3Na_2SiO_3 + Al_2(SO_4)_3 \rightarrow Al_2(SiO_3)_3 + 3Na_2SO_4$$

Example 2

A precipitate of barium sulfate was formed in the presence of an aluminum salt by adding a solution of barium chloride to a solution of aluminum sulfate. The aluminum salt present was more than sufficient to react with the barium salt present. The barium sulfate precipitate thus obtained was filtered off, washed entirely free of soluble salts and dried at 90° C. This material, possessing uncombined aluminum ions because of its formation in a solution containing excess aluminum ions, reduced the fluoride content of a stock solution from 10 parts per million to 0.7 part per million when employed in a contact filter. The equation for the preparation of this material is as follows:

$$3BaCl_2 + Al_2(SO_4)_3 \rightarrow 3BaSO_4 + 2AlCl_3$$

Example 3

It was found that the barium sulfate formed by the addition of sulfuric acid to a solution of barium chloride, in the presence of a solution of aluminum chloride, was as effective in the removal of fluorides as was the material prepared in accordance with Example 2. This indicates that the aluminum salt does not combine in the reactions but that its presence is necessary to provide the aluminum ions. The barium sulfate was thoroughly washed to remove all soluble constituents. The equation for this reaction reads as follows:

$$H_2SO_4 + BaCl_2 + AlCl_3 \rightarrow BaSO_4 + 2HCL + AlCl_3$$

Example 4

A precipitate of calcium sulfate was formed in the presence of a solution of aluminum chloride by adding together solutions of sodium sulfate and calcium chloride. The calcium sulfate precipitate thus prepared after removal of all soluble salts by washing, and after drying, was powdered and added to a water containing 10 parts per million of fluoride. Following removal of the treating material by filtration, the water was analyzed and the fluorine content was found to be 0.6 part per million. The equation showing the preparation of this material follows:

$$Na_2SO_4 + CaCl_2 + AlCl_3 \rightarrow CaSO_4 + 2NaCl + AlCl_3$$

Example 5

An excellent material for the removal of fluorides was formed by the addition of a solution of sodium phosphate to a solution of aluminum chloride, the aluminum salt being present in excess of that required for stoichiometric reaction with the sodium phosphate. The resultant precipitate of aluminum phosphate after filtration and drying at 90° C. was employed in a contact filter to treat water containing fluorides to the extent of 10 parts per million. The effluent from the filter containing this aluminum phosphate was found to contain but 0.5 part per million of fluoride. The equation for the preparation of this material is as follows:

$$Na_3PO_4 + AlCl_3 \rightarrow AlPO_4 + 3NaCl$$

Example 6

Another excellent material for the removal of fluorides was prepared by the precipitation of iron and aluminum hydroxide from a solution containing aluminum sulfate. Such precipitation was effected by adding an alkali solution such as sodium or calcium hydroxide to a mixture of solutions of iron and aluminum salts, the latter mixture containing salts in an amount 10 per cent more than the quantities required for complete reaction with the alkali. Such material was prepared according to the following reaction:

$$8NaOH + FeSO_4 + Al_2(SO_4)_3 \rightarrow Fe(OH)_2 + 2Al(OH)_3 + 4Na_2SO_4$$

It is essential that the aluminum salt be present in excess in order that the resultant precipitate possess maximum fluoride removing properties resulting from the uncombined aluminum ions present.

The combined iron and aluminum hydroxide precipitates are best employed without drying and preferably immediately after precipitation. It has been found advisable to employ a support such as finely ground coke, silica, or other inert materials. Such supporting materials should be present while the reaction is carried out. When employed in the treatment of a stock solution containing 10 parts per million of fluoride, it was found that the effluent contained only 0.3 part per million of fluoride. Such material appeared to be particularly effective as shown by the short period of contact necessary and the extent of removal of the fluoride.

Example 7

A precipitate of titanium sulfate formed in the presence of a solution of aluminum chloride by the addition of sulfuric acid to a solution of titanium chloride was found to be an effective fluoride removing material. The precipitate was subjected to a thorough washing in order to remove all soluble compounds, leaving only a titanium sulfate containing uncombined aluminum ions. Such material was prepared in accordance with the following equation:

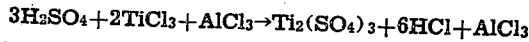

$3H_2SO_4 + 2TiCl_3 + AlCl_3 \rightarrow Ti_2(SO_4)_3 + 6HCl + AlCl_3$

Such material effected a fluoride removal of 9.3 parts per million from a stock solution containing 10.0 parts per million.

It has been determined that the presence of anions and cations of other salts does not affect in any manner the efficiency of the above described materials and the removal of fluorides. Certain of the above test treatments were repeated, employing as a stock solution a tap water in which the fluoride content was adjusted to 10.0 parts per million. Results obtained were identical with those obtained where the stock solution was prepared with distilled water. It was thus definitely established that the presence of foreign ions have no effect on the efficiency of such materials.

In addition to the aluminum sulfate and aluminum chloride solutions employed in the above examples, it has been determined that solutions of other aluminum salts such as nitrates, acetates, and various alums were effective in contributing fluoride removing properties to precipitates formed in the presence of solutions of such salts. After formation of the precipitate, the soluble aluminum salts are removed by washing, leaving behind only uncombined aluminum ions in adsorbed form upon the precipitate.

The efficacious removal of fluoride ions by this process is attributed to the fact that when such precipitates are formed in the presence of solutions of aluminum salts, a very high charge of aluminum ions is introduced into the precipitate. Excess soluble aluminum salts can be removed by washing, while the uncombined aluminum ions cannot be washed from the finished product. Fluoride removing properties are therefore definitely due to the adsorbed insoluble uncombined aluminum ions.

Due to the high content of aluminum ions, only a small quantity of such materials is necessary to effect removal of fluorides to below the toxic point of 1.0 part per million. For this reason, therefore, the costs of such processes are considerably decreased and there is provided a very satisfactory and efficient new process for the removal of fluorides from potable waters.

It is to be expressly understood that the foregoing description and examples are merely illustrative and are not to be considered as limiting our invention beyond the scope of the subjoined claims.

Having thus described the present invention, what we claim as new and useful and desire to secure by Letters Patent, is:

1. The process of reducing the fluoride content of potable water which comprises contacting the water with a water-insoluble chemical compound characterized in that it is charged with uncombined aluminum ions which react with the fluoride ions to effect their removal.

2. A process of removing fluorides from water comprising contacting the water containing the fluoride with a water washed water-insoluble chemical compound which has been formed in the presence of a large concentration of aluminum ions.

3. The process of removing fluorides from water comprising the steps of bringing the water into contact with a water-insoluble chemical compound characterized in that it is free from soluble aluminum salts and charged with uncombined aluminum ions, regenerating the fluoride removing compound when exhausted and further contacting such compound with additional fluoride containing waters.

4. A water washed water-insoluble chemical compound for the removal of fluorides from potable water characterized in that it is charged with uncombined aluminum ions which react with the fluoride ions to effect their removal.

5. A reagent for the removal of fluorides from water consisting of a water-insoluble chemical precipitate formed in the presence of a large concentration of aluminum ions.

6. A reagent for the removal of fluorides from water consisting of a water-insoluble chemical precipitate containing free aluminum ions.

OLIVER M. URBAIN.
WILLIAM R. STEMEN.